United States Patent
Zhang et al.

(10) Patent No.: US 12,475,565 B2
(45) Date of Patent: Nov. 18, 2025

(54) AMODAL INSTANCE SEGMENTATION USING DIFFUSION MODELS

(71) Applicant: ADOBE INC., San Jose, CA (US)

(72) Inventors: Jianming Zhang, Fremont, CA (US); Qing Liu, Santa Clara, CA (US); Yilin Wang, Sunnyvale, CA (US); Zhe Lin, Clyde Hill, WA (US); Bowen Zhang, Adelaide (AU)

(73) Assignee: ADOBE INC., San Jose, CA (US)

( * ) Notice: Subject to any disclaimer, the term of this patent is extended or adjusted under 35 U.S.C. 154(b) by 470 days.

(21) Appl. No.: 18/056,987

(22) Filed: Nov. 18, 2022

(65) Prior Publication Data
US 2024/0169541 A1   May 23, 2024

(51) Int. Cl.
  *G06T 7/00* (2017.01)
  *G06T 7/10* (2017.01)
(52) U.S. Cl.
  CPC ...... *G06T 7/10* (2017.01); *G06T 2207/20081* (2013.01)
(58) Field of Classification Search
  CPC ............. G06T 7/10; G06T 2207/20081; G06T 2207/20084; G06T 7/11
  See application file for complete search history.

(56) References Cited

U.S. PATENT DOCUMENTS

| | | | | |
|---|---|---|---|---|
| 2006/0291001 A1* | 12/2006 | Sung | .................... | G06V 40/171 358/448 |
| 2021/0150751 A1* | 5/2021 | Liu | ...................... | G06V 30/274 |
| 2021/0279503 A1* | 9/2021 | Qi | ....................... | G06F 18/2413 |
| 2021/0304422 A1* | 9/2021 | Yu | .............................. | G06T 5/77 |
| 2022/0148284 A1* | 5/2022 | Kim | ....................... | G06V 10/24 |
| 2023/0026278 A1* | 1/2023 | Vianello | .............. | G06V 20/176 |
| 2023/0095092 A1* | 3/2023 | Xiao | .......................... | G06T 5/60 382/254 |
| 2023/0103638 A1* | 4/2023 | Saharia | ................ | G06V 10/454 382/155 |
| 2023/0289971 A1* | 9/2023 | Back | ..................... | G06V 10/806 |
| 2024/0161250 A1* | 5/2024 | Balaji | ........................ | G06T 5/70 |

OTHER PUBLICATIONS

Alexe, et al, "Measuring the Objectness of Image Windows", IEEE Transactions on Pattern Analysis and Machine Intelligence, vol. 34, No. 11, 2012, pp. 2189-2202, 14 pages.

Arbeláez, et al, "Contour Detection and Hierarchical Image Segmentation", IEEE Transactions on Pattern Analysis and Machine Intelligence, vol. (33) 2011, 898-916, 20 pages.

(Continued)

*Primary Examiner* — Van D Huynh
(74) *Attorney, Agent, or Firm* — F. CHAU & ASSOCIATES, LLC

(57) ABSTRACT

Systems and methods for instance segmentation are described. Embodiments include identifying an input image comprising an object that includes a visible region and an occluded region that is concealed in the input image. A mask network generates an instance mask for the input image that indicates the visible region of the object. A diffusion model then generates a segmentation mask for the input image based on the instance mask. The segmentation mask indicates a completed region of the object that includes the visible region and the occluded region.

20 Claims, 13 Drawing Sheets

(56) References Cited

OTHER PUBLICATIONS

Bao, et al, "BEIT: BERT Pre-Training of Image Transformers", arXiv preprint arXiv:2106.08254v2 [cs.CV] Sep. 3, 2022, 18 pages.
Carion, et al, "End-to-End Object Detection with Transformers", arXiv preprint arXiv:2005.12872v3 [cs.CV] May 28, 2020, 26 pages.
Cheng, et al, "Masked-attention Mask Transformer for Universal Image Segmentation", arXiv preprint arXiv:2112.01527v3 [cs.CV] Jun. 15, 2022, 20 pages.
Cheng, et al, "Per-Pixel Classification is Not All You Need for Semantic Segmentation", arXiv preprint arXiv:2107.06278v2 [cs.CV] Oct. 31, 2021, 17 pages.
Connor, et al, "Representing Closed Transformation Paths in Encoded Network Latent Space", arXiv preprint strucarXiv:1912.02644v1 [stat.ML] Dec. 5, 2019, 10 pages.
Croitoru, et al, "Diffusion Models in Vision: A Survey", arXiv:2209.04747v2 [cs.CV] Oct. 6, 2022, 22 pages.
Dai, et al, "Convolutional Feature Masking for Joint Object and Stuff Segmentation", arXiv preprint arXiv:1412.1283v4 [cs.CV] Apr. 2, 2015, 10 pages.
Dalal, et al, "Histograms of Oriented Gradients for Human Detection", IEEE Computer Society Conference on Computer Vision and Pattern Recognition (CVPR'05), Jun. 20-25, 2005, 8 pages.
Donahue, et al, "DeCAF: A Deep Convolutional Activation Feature for Generic Visual Recognition", arXiv preprint arXiv:1310.1531v1 [cs.CV] Oct. 6, 2013, 10 pages.
Dosovitskiy, et al, "An Image is Worth 16X16 Words: Transformers for Image Recognition at Scale", arXiv preprint arXiv:2010.11929v2 [cs.CV] Jun. 3, 2021, 22 pages.
Follmann, et al, "Learning to See the Invisible: End-to-End Trainable Amodal Instance Segmentation", arXiv preprint arXiv:1804.08864v1 [cs.CV] Apr. 24, 2018, 21 pages.
Follmann, et al, "Oriented Boxes for Accurate Instance Segmentation", arXiv preprint arXiv:1911.07732v1 [cs.CV] Nov. 18, 2019, 8 pages.
Fu, et al, "IMP: Instance Mask Projection for High Accuracy Semantic Segmentation of Things", arXiv preprint arXiv:1906.06597v1 [cs.CV] Jun. 15, 2019, 13 pages.
Gansbeke, et al, "Unsupervised Semantic Segmentation by Contrasting Object Mask Proposals", arXiv preprint arXiv:2102.06191v3 [cs.CV] Aug. 3, 2021, 14 pages.
Girshick, et al, "Fast R-CNN", arXiv preprint arXiv:1504.08083v2 [cs.CV] Sep. 27, 2015, 9 pages.
Girshick, et al, "Region-based Convolutional Networks for Accurate Object Detection and Segmentation", IEEE Transactions on Pattern Analysis and Machine Intelligence, vol. 38, No. 1, pp. 142-158, Jan. 1, 2016, 16 pages.
Girshick, et al, "Rich feature hierarchies for accurate object detection and semantic segmentation", arXiv preprint arXiv:1311.2524v5 [cs.CV] Oct. 22, 2014, 21 pages.
Gao, et al, "Res2Net: A New Multi-scale Backbone Architecture", arXiv preprint arXiv:1904.01169v3 [cs.CV] Jan. 27, 2021, 11 pages.
Hariharan, et al, "Simultaneous Detection and Segmentation", arXiv preprint arXiv:1407.1808v1 [cs.CV] Jul. 7, 2014, 16 pages.
He, et al, "Deep Residual Learning for Image Recognition", arXiv preprint arXiv:1512.03385v1 [cs.CV] Dec. 10, 2015, 12 pages.
He, et al, "Mask R-CNN", arXiv preprint arXiv:1703.06870v1 [cs.CV] Mar. 20, 2017, 9 pages.
He, et al, "Mask R-CNN", arXiv preprint arXiv:1703.06870v3 [cs.CV] Jan. 24, 2018, 12 pages.
He, et al, "Spatial Pyramid Pooling in Deep Convolutional Networks for Visual Recognition", arXiv preprint arXiv:1406.4729v4 [cs.CV] Apr. 23, 2015, 14 pages.
Heitz, et al, "Learning Spatial Context: Using Stuff to Find Things", Computer Vision—ECCV 2008, ECCV 2008. Lecture Notes in Computer Science, vol. 5302. Springer, 14 pages.
Ho, et al, "Classifier-Free Diffusion Guidance", arXiv preprint arXiv:2207.12598v1 [cs.LG] Jul. 26, 2022, 14 pages.
Jiang, et al, "All Tokens Matter: Token Labeling for Training Better Vision Transformers", arXiv preprint arXiv:2104.10858v3 [cs.CV] Jun. 9, 2021, 16 pages.
Kingma, et al, "Auto-Encoding Variational Bayes", arXiv preprint arXiv:1312.6114v10 [stat.ML] May 1, 2014, 14 pages.
Kirillov, et al, "Panoptic Segmentation", arXiv preprint arXiv:1801.00868v3 [cs.CV] Apr. 10, 2019, 10 pages.
LeCun, Y, et al., "Backpropagation Applied to Handwritten Zip Code Recognition", Neural Computation, vol. 1, Issue: 4, Dec. 1989, 11 pages.
Li, et al, "Amodal Instance Segmentation", arXiv preprint arXiv:1604.08202v2 [cs.CV] Aug. 17, 2016, 23 pages.
Li, et al, "Lecture 1: Welcome to CS231n", Stanford University, Apr. 4, 2017, 48 pages.
Liu, et al, "Swin Transformer: Hierarchical Vision Transformer using Shifted Windows", arXiv preprint arXiv:2103.14030v2 [cs.CV] Aug. 17, 2021, 14 pages.
Long, et al, "Fully Convolutional Networks for Semantic Segmentation", arXiv preprint arXiv:1411.4038v2 [cs.CV] Mar. 8, 2015, 10 pages.
Lowe, David G., "Distinctive Image Features from Scale-Invariant Keypoints", International Journal of Computer Vision 60(2), 91-110, Jan. 2004, Kluwer Academic Publishers, 20 pages.
Luo, Calvin, "Understanding Diffusion Models: A Unified Perspective", arXiv preprint arXiv:2208.11970v1 [cs.LG] Aug. 25, 2022, 23 pages.
Meng, et al, "Sdedit: Guided Image Synthesis and Editing With Stochastic Differential Equations", arXiv preprint arXiv:2108.01073v2 [cs.CV] Jan. 5, 2022, 33 pages.
Qi, et al, "Amodal Instance Segmentation with KINS Dataset", IEEE/CVF Conference on Computer Vision and Pattern Recognition (CVPR) 2019, 10 pages.
Ramesh, et al, "Zero-Shot Text-to-Image Generation", arXiv preprint arXiv:2102.12092v1 [cs.CV] Feb. 24, 2021, 20 pages.
Redmon, et al, "YOLOv3: An Incremental Improvement", arXiv preprint arXiv:1804.02767v1 [cs.CV] Apr. 8, 2018, 6 pages.
Redmon, et al, "YOLO9000: Better, Faster, Stronger", arXiv preprint arXiv:1612.08242v1 [cs.CV] Dec. 25, 2016, 9 pages.
Redmon, et al, "You Only Look Once: Unified, Real-Time Object Detection", arXiv preprint arXiv:1506.02640v5 [cs.CV] May 9, 2016, 10 pages.
Ren, et al, "Faster R-CNN: Towards Real-Time Object Detection with Region Proposal Networks", arXiv preprint arXiv:1506.01497v3 [cs.CV] Jan. 6, 2016, 14 pages.
Ronneberger, et al, "U-Net: Convolutional Networks for Biomedical Image Segmentation", arXiv preprint arXiv:1505.04597v1 [cs.CV] May 18, 2015, 8 pages.
Ryoo, et al, "TokenLearner: What Can 8 Learned Tokens Do for Images and Videos?", arXiv preprint arXiv:2106.11297v4 [cs.CV] Apr. 3, 2022, 16 pages.
Sohl-Dickstein, et al, "Deep Unsupervised Learning using Nonequilibrium Thermodynamics", arXiv preprint arXiv:1503.03585v8 [cs.LG] Nov. 18, 2015, 18 pages.
Szegedy, et al, "Deep Neural Networks for Object Detection", Advances in Neural Information Processing Systems 26 (NIPS), Dec. 5-10, 2013, 9 pages.
Tian, et al, "Conditional Convolutions for Instance Segmentation", arXiv preprint arXiv:2003.05664v4 [cs.CV] Jul. 26, 2020, 18 pages.
Wang, et al, "SOLO: Segmenting Objects by Locations", arXiv preprint arXiv:1912.04488v3 [cs.CV] Jul. 19, 2020, 19 pages.
Wu, et al, "Logit-based Uncertainty Measure in Classification", arXiv preprint arXiv:2107.02845v1 [cs.LG] Jul. 6, 2021, 14 pages.
Xiao, et al, "Amodal Segmentation Based on Visible Region Segmentation and Shape Prior", arXiv preprint arXiv:2012.05598v2 [cs.CV] Dec. 19, 2020, 9 pages.
Xie, et al, "SimMIM: a Simple Framework for Masked Image Modeling", arXiv preprint arXiv:2111.09886 [cs.CV] Nov. 18, 2021, 13 pages.
Zhu, et al, "Semantic Amodal Segmentation", arXiv preprint arXiv:1509.01329v2 [cs.CV] Dec. 14, 2016, 11 pages.

* cited by examiner

AMODAL INSTANCE SEGMENTATION USING DIFFUSION MODELS

BACKGROUND

The following relates generally to machine learning, and more specifically to using a machine learning model for image processing.

Machine learning models have been trained for a variety of image processing tasks. For example, object detection tasks can involve localizing objects within an image, which can further involve predicting a bounding box around each instance of an object in an image. Semantic segmentation predicts a class label for each pixel of an object or region in an image, where different object instances are not taken into account. Instance segmentation is an image processing task related to object detection and semantic segmentation that involves identifying one or more instances of objects and elements that appear in an image.

A variety of machine learning models have been used for image processing. Diffusion models are a category of machine learning model that generates data based on stochastic processes. Specifically, diffusion models introduce random noise at multiple levels and train a network to remove the noise. Once trained, a diffusion model can start with random noise and generate data similar to the training data.

SUMMARY

The present disclosure describes systems and methods for using a machine learning to perform instance segmentation on an image. Embodiments of the present disclosure provide a two-step framework to perform amodal instance segmentation and generation of one or more amodal segmentation masks. In a first step, a mask network can be used to predict an instance mask and a possible occlusion mask, where the occlusion mask is a rough estimation of the possible "invisible" region of the occluded objects. In a second step, a diffusion model can be used to complete the amodal mask based on the inference results from step one. Accordingly, embodiments of the present disclosure can utilize a diffusion model to generate the amodal segmentation mask based on the inference results and generate a complete image of an occluded object.

A method, apparatus, non-transitory computer readable medium, and system for amodal segmentation mask generation and image completion are described. One or more aspects of the method, apparatus, non-transitory computer readable medium, and system include identifying an input image comprising an object that includes a visible region and an occluded region, wherein the occluded region is concealed in the input image; generating an instance mask for the input image using a mask network, wherein the instance mask indicates the visible region of the object; and generating a segmentation mask for the input image based on the instance mask using a diffusion model, wherein the segmentation mask indicates a completed region of the object that includes the visible region and the occluded region.

In another aspect, a method, apparatus, non-transitory computer readable medium, and system include identifying a training image and a ground truth segmentation mask for the training image, wherein the training image comprising an object that includes a visible region and an occluded region and the ground truth segmentation mask indicates a completed region of the object that includes the visible region and the occluded region; generating an instance mask for the training image using a mask network, wherein the instance mask indicates the visible region of the object; generating a predicted segmentation mask for the training image based on the instance mask using a diffusion model, wherein the segmentation mask indicates the completed region; comparing the predicted segmentation mask to the ground truth segmentation mask; and training the mask network by updating the parameters of the mask network based on the comparison.

In another aspect, an apparatus and system for amodal segmentation mask generation and image completion are described. One or more aspects of the apparatus and system include a a processor; a memory containing instructions executable by the processor; a mask network configured to generate an instance mask for an input image comprising an object that includes a visible region and an occluded region, wherein the instance mask indicates the visible region of the object; and a diffusion model configured to generate a segmentation mask for the input image based on the instance mask, wherein the segmentation mask indicates a complete region of the object that includes the visible region and the occluded region.

DETAILED DESCRIPTION

Figure 1:
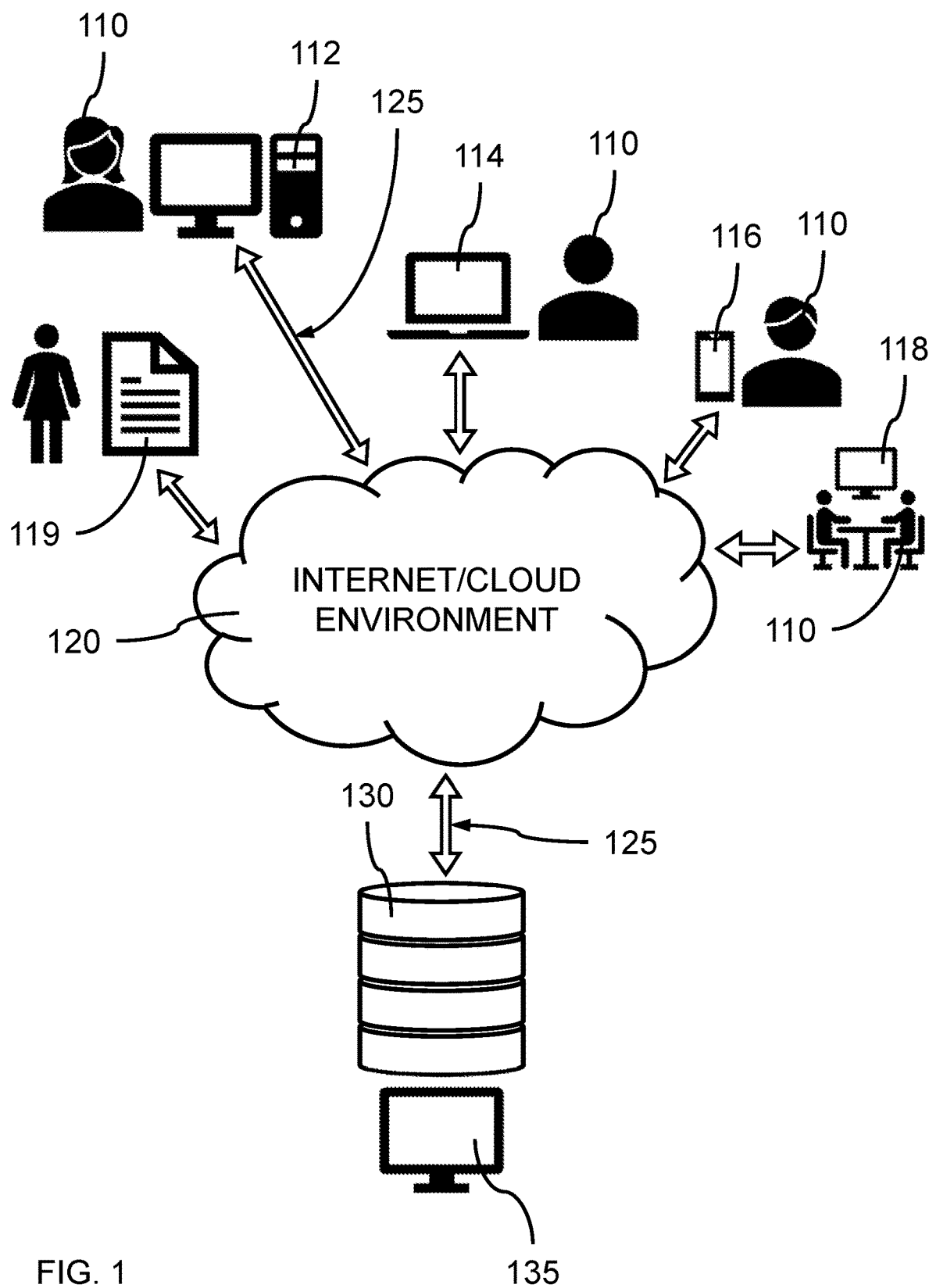
FIG. 1 is an illustrative depiction of users interacting with an image processing system, including a mask network, through their devices, according to aspects of the present disclosure.

Embodiments of the present disclosure provide systems and methods for generating instance segmentation information for an image using a machine learning model. In some embodiments, instance segmentation information can be provided even when objects are occluded or hidden by other objects in an image.

Foreground and background objects in a two-dimensional image can include invisible, occluded parts of objects. Automated systems, including robotic vision systems, can have problems determining if objects are occluded or hidden by one or more other objects, particularly when the occlusion region is large and/or the occluded shape is complicated. This problem leads to the need for a machine learning task of semantic amodal segmentation, which involves determining which parts of an object are occluded and which object(s) an the occlude(s).

Unlike a human being that can comprehend foreground and background objects and regions, computer systems and model often have difficulties predicting the position, shape, and size of an occluded (i.e., hidden) part of an object. The model may not have a visual indication of how to extend a visible region into an invisible, occluded region because there are no edges or other visual features that indicate the contour of the invisible parts of the object. Furthermore, if an object is occluded by another object instance of the same class, the model may not be able to determine where to terminate a mask for one instance and begin a new mask for the other instance.

Embodiments of the present disclosure provide an improvement over existing object detection system by enabling the identification of the shape and location of objects to include regions that are occluded by other objects. In some embodiments, a diffusion model can be used to complete an amodal mask, and provides a more accurate amodal mask estimation especially when the occlusion region is large and the occluded shape is complicated.

In one or more embodiments, a neural network model, referred to as a mask model, is provided that can identify the visible parts of objects in an image and predict the extension of the objects into the occluded, invisible regions, where the model can predict the visible, invisible, and amodal masks for the various object(s).

Identifying a visible portion of an object is referred to as modal instance segmentation, whereas identifying the combination of visible and occluded portions of an object is referred to as amodal instance segmentation. Predicting the invisible part of an object is difficult, at least because there are many different possible configurations for the invisible part. An amodal segmentation mask may be hypothesized from a modal segmentation mask, where a modal mask of an occluding object may be compared to the modal mask of the occluded object.

In various embodiments, an image processing system including the mask model can determine whether an object is occluded, where it is occluded, and the extent to which it is occluded. The image processing system may determine a shape of the occluded portion of an object even if the mask model has not seen the whole object previously.

In various embodiments, a diffusion model can predict the unseen portion of an object through training. During training, the diffusion model learns to reverse a diffusion process in order to generate new data for the unseen portion. The visible portions of an occluding and occluded object can guide the diffusion model in recreating the unseen portion, and avoid interference from an occluding object.

In various embodiments, the diffusion model can recreate an unseen, occluded portion of an occluded object by generating modal segmentation masks for the visible portions of the occluding and occluded objects, and an occlusion mask that combines the modal segmentation masks of each object.

In one or more embodiments, a diffusion model is provided, where the diffusion model is trained to predict the invisible portion of an object through supervised learning. The diffusion model can be trained to perform mask completion of an amodal segmentation mask using unoccluded object images labeled with ground truths, partially occluded object images with ground truths, and amodal segmentation masks as ground truths (i.e., true masks). The training data includes instance masks and occlusion masks as ground truths. A mask model can learn to distinguish occluding and occluded objects and predict the size and shape of the occluded region. The mask model can include two parts, where a first part predicts the occluded region, and a second part generates an amodal segmentation mask that represents the complete object.

In various embodiments, the mask model can identify two or more instances of objects in an image, where at least one of the objects occludes another of the objects, and predict whether the object(s) are occluded or not. The identification of the objects and a determination that an object is occluded can be based on supervised training using images with ground truths. An instance mask may be generated for each instance of the objects through instance segmentation, where a predicted occlusion mask may be different due to occlusion.

Accordingly, embodiments of the present disclosure generate improved instance segmentation results by identifying both visible and occluded areas of one or more objects in an image. In some cases, the regions associated with different objects overlap (i.e., if part of one is occluded by the other). This enables users to more accurately identify the locations of objects in an image in a more realistic way. In some cases, embodiments provide instance segmentation data for downstream tasks such as navigation that enables improved accuracy of the downstream tasks due to providing more complete location information of objects in an image.

System Architecture

FIG. 1 is an illustrative depiction of users interacting with an image processing system, including a mask network, through their devices, according to aspects of the present disclosure.

According to some embodiments, users may provide an image with one or more objects that can have modal and amodal regions, and a machine learning model may perform amodal segmentation or semantic amodal segmentation on the image by providing one or more mask predictions. In various embodiments, the mask predictions can be category independent. The term "modal" refers to the visible region and visible region masks. The term "amodal segmentation" refers to the full extent of each object that is identified, not just pixels in the visible region. The term "semantic amodal segmentation" means the prediction of an invisible region of each object instance is included. In some cases, the system generates an occlusion mask, which refers to a mask for a region of overlapping objects in which an invisible region of one object is covered by a visible region of another object. An amodal mask refers to a union of a mask segment for a visible region and a mask segment of the invisible, occluded region of the object.

In one or more embodiments, a user 110 can interact with a remote image processing system 130 through the cloud/internet 120 by electronic communication 125. A user 110 may interact with the image processing system 130 using, for example, a desktop computer 112, a laptop computer 114, a handheld mobile device 116, for example, a smart phone or tablet, a smart tv 118, or document processing system 119, including a scanner, fax machine, and/or document processing software. In various embodiments, the image processing system 130 can include, for example, a deep neural network, including, but not limited to, a diffusion model (DM), variational autoencoder (VAE), generative adversarial network (GAN), convolutional neural networks (CNN), transformer networks, encoder neural networks, multi-layer perceptrons (MLPs), and combinations thereof, although other deep neural networks are also contemplated.

In various embodiments, the user 110 can communicate 125 with the image processing system 130 to submit data (e.g., image(s)) for analysis, and receive results from the image processing system 130.

In various embodiments, the cloud 120 is a computer network configured to provide on-demand availability of computer system resources, such as data storage and computing power. In some examples, the cloud 120 provides resources without active management by user 110. The internet/cloud environment 120 can include data centers available to multiple users over the Internet, where the internet can be a global computer network providing a variety of information and communication facilities. Some large cloud networks have functions distributed over multiple locations from central servers. A server is designated an edge server if it has a direct or close connection to a user. In some cases, cloud environment 120 may be limited to a single organization. In other examples, cloud 120 is available to many organizations, where communication may be through the internet. In an example, cloud/internet 120 includes a multi-layer communications network comprising multiple edge routers and core routers. In another example, cloud 120 is based on a local collection of switches in a single physical location. According to some aspects, the internet/cloud environment 120 provides electronic communications between user device(s) 112, 114, 116, 118, and the image processing system 130.

In various embodiments, the user devices 112, 114, 116, 118, 119, can include software that can communicate and interact with the image processing system(s) 130, including, but not limited to, submitting a digital image (e.g., photos, movies, etc.) for analysis.

Figure 2:
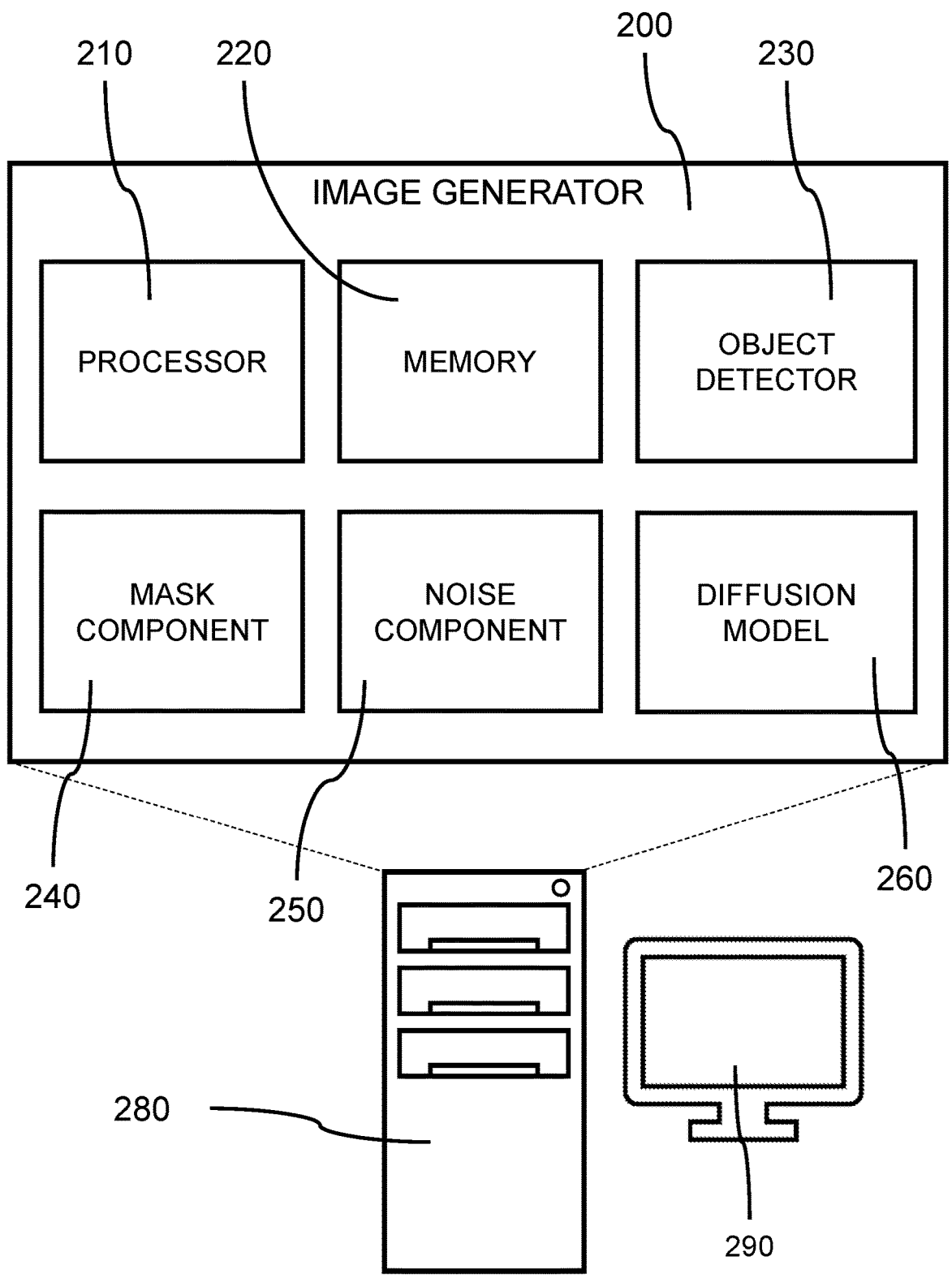
FIG. 2 shows a block diagram of an example of an image generator according to aspects of the present disclosure.

FIG. 2 shows a block diagram of an example of an image generator according to aspects of the present disclosure. According to some aspects, an image generator 200 receives an original image including original content having an occluded portion and an occluding portion.

In various embodiments, the image generator 200 can include a computer system 280 including one or more processors 210, computer memory 220, an object detector 230, a mask component 240, a noise component 250, and a diffusion model 260. The computer system 280 of the image generator 200 can be operatively coupled to a display device 290 (e.g., computer screen) for presenting prompts and images to a user 110, and operatively coupled to input devices to receive input from the user, including the original image.

In some examples, a first machine learning model comprises the object detector 230 the mask component 240, or both. An example of the first machine learning model is described with reference to FIG. 7. The first machine learning model generates an output mask that is then used as input for a second machine learning model, e.g., diffusion model 260. An example of the diffusion model 260 is provided with reference to FIG. 3.

According to some aspects, object detector 230 can perform object detection using a computational model that determines where one or more objects are located in an image, where object detection may include the use of bounding boxes and masks. Object detection can include instance segmentation, which detects multiple instances of objects of the same class in an image. In contrast, semantic segmentation identifies regions of an image that belong to the same object class. Semantic segmentation classifies each pixel of an image into one of a set of categories or classes without distinguishing between different instances of the same object class. Image segmentation partitions a digital image into multiple image objects or regions and locates the objects, regions, and boundaries within the image. Image segmentation can be based on the characteristics of the pixels in the image, for example, color, texture, shape, enclosed area, etc.

In various embodiments, the mask component 240 can generate a mask, which is a set of binary values for a region of interest in the image that can provide spatial filtering. According to some aspects, mask component 240 identifies a mask indicating the region of the original image. A mask can be used to specify a region of an image that contains an object of interest based identified through object detection. Different masks can identify different regions and objects in an image. The mask component 240 can include algorithms that generate such masks for an image provided to the image generator 220. In various embodiments, a mask can be generated, for example using a Mask R-CNN model and technique or granulated RCNN model and technique.

In various embodiments, the noise component 250 can generate Gaussian noise for the diffusion model 260. Gaussian noise is signal noise that has a probability density function (PDF) equal to that of the normal distribution, also referred to as a Gaussian distribution. The Gaussian noise can be added to the image in steps using an additive noise model, where the noise is not part of the original image signal. An image can be asymptotically transformed into pure Gaussian noise.

In various embodiments, the diffusion model 260 can be a regular diffusion model, which can be used as the base generative model, and masked image synthesis method with stochastic differential equations may be used as a baseline. Note that the same hyperparameters (i.e., noise strength, total diffusion steps, sampling schedule, classifier free guidance strength C) can be used.

Diffusion models are a class of generative models that convert Gaussian noise into images from a learned data distribution using an iterative denoising process. Diffusion models are also latent variable models with latent vectors, $z=\{z_t | t \in [0, 1]\}$, that obey a forward process $q(z|x)$ starting at data $x \sim p(x)$. This forward process is a Gaussian process that satisfies the Markovian structure. For image generation, the diffusion model is trained to reverse the forward noising process (i.e., denoising, $z_t \sim q(z_t|x)$).

In various embodiments, the computation and parameters in a diffusion model 260 take part in the learned mapping function which reduces noise at each timestep (denoted as F). The model takes as input x (i.e., noisy or partially denoised image depending on the timestep), the timestep t, and conditioning information the model was trained to use. In some cases, the conditioning information can be a text prompt (e.g., TP, " ", and AP are text prompts). Classifier-free guidance is a mechanism to vary and control the influence of the conditioning on the sampled distribution at inference. In some cases, the conditioning can be replaced by the null token (i.e., the empty string, " ", in case of text conditioning) during training. A single scalar can control effect of the conditioning during inference.

According to some aspects, noise component 250 generates a noise map based on the original image and the mask, where the amodal segmentation mask is generated based on the noise map. In some examples, noise component 250 generates an iterative noise map for each of the set of masks with successively reduced noise to produce the output image. In some examples, the noise component 250 is an element of the diffusion model 260.

According to some aspects, diffusion model 260 generates the amodal segmentation mask based on the noise map. The diffusion model 260 may generate an output image including the original content from the original image and the additional content in the region or interest. In some aspects, the output image combines additional content in a manner consistent with the original content. In some examples, diffusion model 260 iteratively produces a set of output images.

Figure 3:
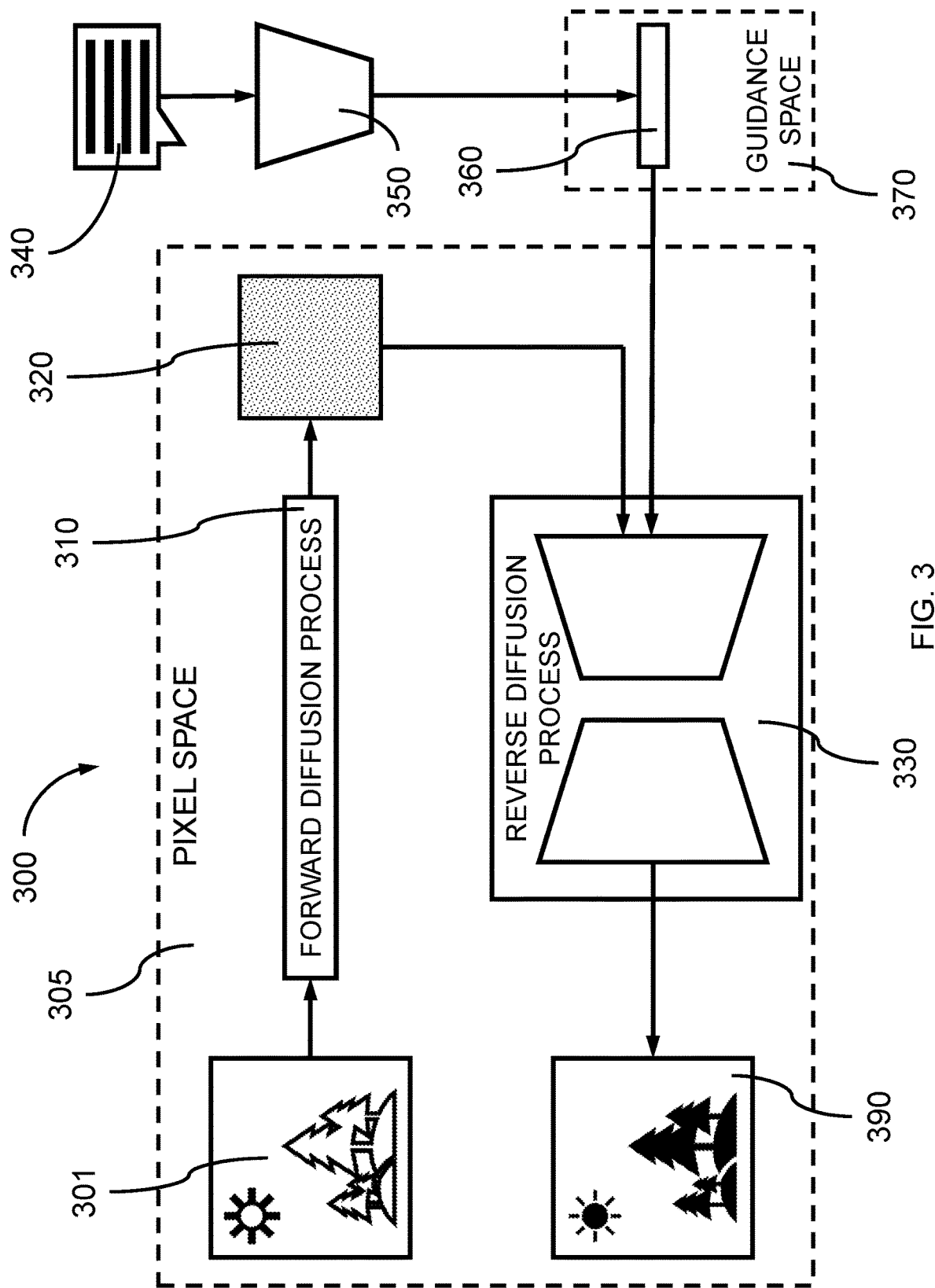
FIG. 3 shows a block diagram of an example of a guided diffusion model according to aspects of the present disclosure.

FIG. 3 shows a block diagram of an example of a guided diffusion model 300 according to aspects of the present disclosure. The guided latent diffusion model 300 depicted in FIG. 3 is an example of, or includes aspects of, the corresponding diffusion model element 260 described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 300 may take an original image 301 in a pixel space 305 as input and apply forward diffusion process 310 to gradually add noise to the original image 305 to obtain noisy images 320 at various noise levels.

Next, a reverse diffusion process 330 (e.g., a U-Net Artificial Neural Network (ANN)) gradually removes the noise from the noisy images 320 at the various noise levels to obtain an output image 390. In some cases, an output image 390 is created from each of the various noise levels. The output image 390 can be compared to the original image 301 to train the reverse diffusion process 330.

The reverse diffusion process 330 can also be guided based on a text prompt or description 340, or another guidance prompt, such as an image, a layout, a segmentation map, etc. The text prompt 340 can be encoded using a text encoder 350 (e.g., a multimodal encoder) to obtain guidance features 360 in guidance space 370. The guidance features 360 can be combined with the noisy images 320 at one or more layers of the reverse diffusion process 330 to ensure that the output image 390 includes content described by the text prompt 340. For example, guidance features 360 can be combined with the noisy features using a cross-attention block within the reverse diffusion process 330.

Figure 4:
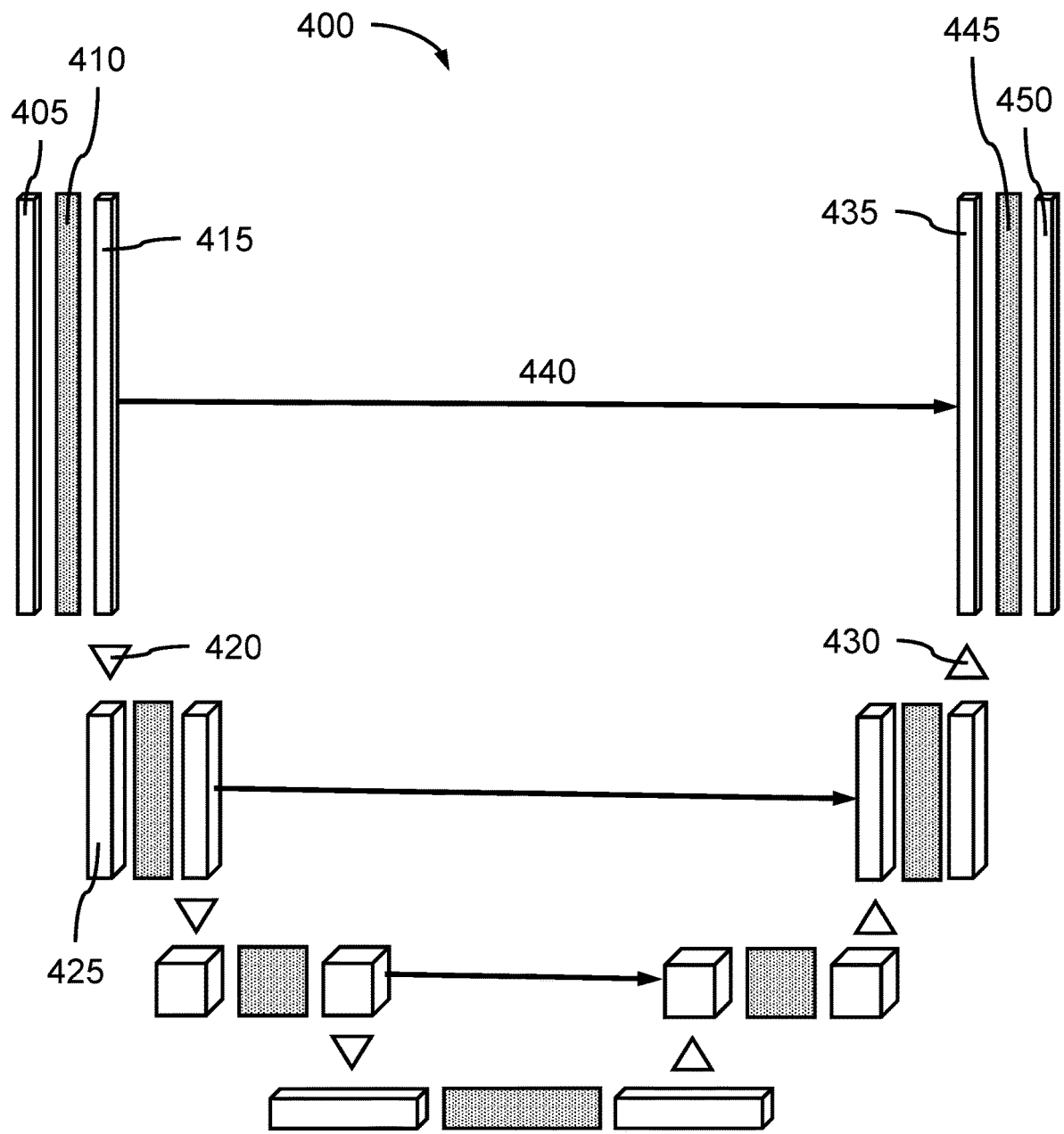
FIG. 4 shows an example of a U-Net according to aspects of the present disclosure.

FIG. 4 shows an example of a U-Net 400 according to aspects of the present disclosure. The U-Net 400 depicted in FIG. 4 is an example of, or includes aspects of, the architecture used within the reverse diffusion process described with reference to FIG. 3.

In some examples, diffusion models are based on a neural network architecture known as a U-Net. The U-Net 400 takes input features 405 having an initial resolution and an initial number of channels, and processes the input features 405 using an initial neural network layer 410 (e.g., a convolutional network layer) to produce intermediate features 415. The intermediate features 415 are then down-sampled using a down-sampling layer 420 such that down-sampled features 425 features have a resolution less than the initial resolution and a number of channels greater than the initial number of channels.

This process is repeated multiple times, and then the process is reversed. That is, the down-sampled features 425 are up-sampled using up-sampling process 430 to obtain up-sampled features 435. The up-sampled features 435 can be combined with intermediate features 415 having a same resolution and number of channels via a skip connection 440. These inputs are processed using a final neural network layer 445 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

Diffusion

Figure 5:
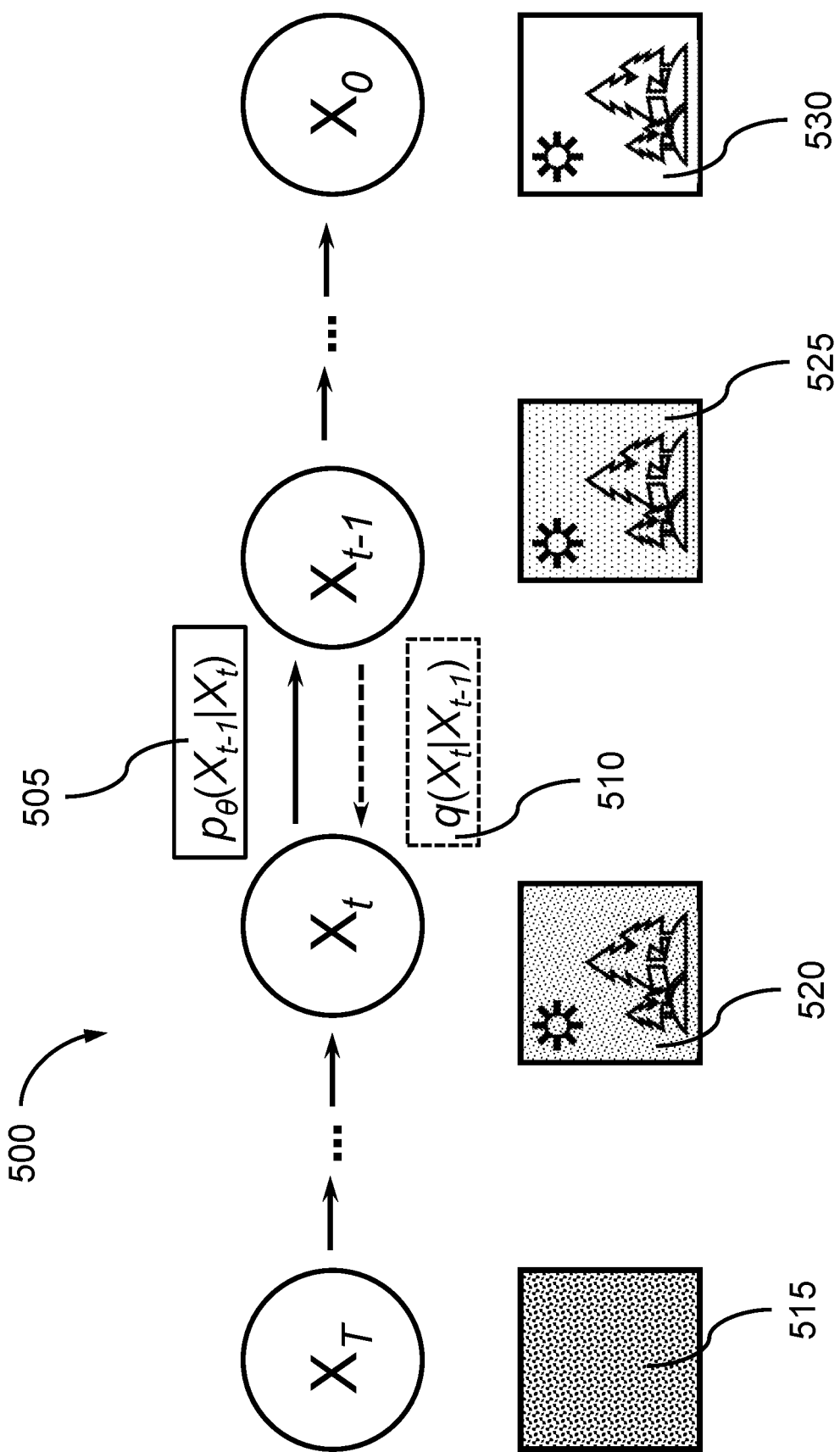
FIG. 5 shows a diffusion process according to aspects of the present disclosure.

FIG. 5 shows a diffusion process according to aspects of the present disclosure. As described above with reference to FIG. 3, a diffusion model 300 can include both a forward diffusion process 505 for adding noise to an image (or features in a latent space) and a reverse diffusion process 510 for denoising the images (or features) to obtain a denoised image. The forward diffusion process 505 can be represented as $p_\theta(x_{t-1}|x_t)$, and the reverse diffusion process 510 can be represented as $q(x_t|x_{t-1})$. In some cases, the forward diffusion process 505 is used during training to generate images with successively greater noise, and a neural network is trained to perform the reverse diffusion process 510 (i.e., to successively remove the noise).

In an example forward process for a latent diffusion model, the model maps an observed variable $x_0$ (either in a pixel space or a latent space) to intermediate variables using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 510, the model begins with noisy data $x_T$, such as a noisy image 515 and denoises the data to obtain the $p(x_{t-1}|x_t)$. At each step $t-1$, the reverse diffusion process 510 takes $x_t$, such as first intermediate image 520, and t as input. Here, t represents a step in the sequence of transitions associated with different noise levels. The reverse diffusion process 510 outputs $x_{t-1}$, such as second intermediate image 525 iteratively until $x_T$ is reverted back to $x_0$, the original image 530. The reverse process can be represented as:

$$p_\theta(x_{t-1}|x_t) := \mathcal{N}(x_{t-1}; \mu_\theta(x_t,t), \Sigma_\theta(x_t,t)). \tag{4}$$

The joint probability of a sequence of samples in the Markov chain can be written as a product of conditionals and the marginal probability:

$$x_T : p_\theta(x_{0:T}) := p(x_T) \Pi_{t=1}^T p_\theta(x_{t-1}|x_t), \tag{5}$$

where $p(x_T) = \mathcal{N}(x_T; 0, I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 6:
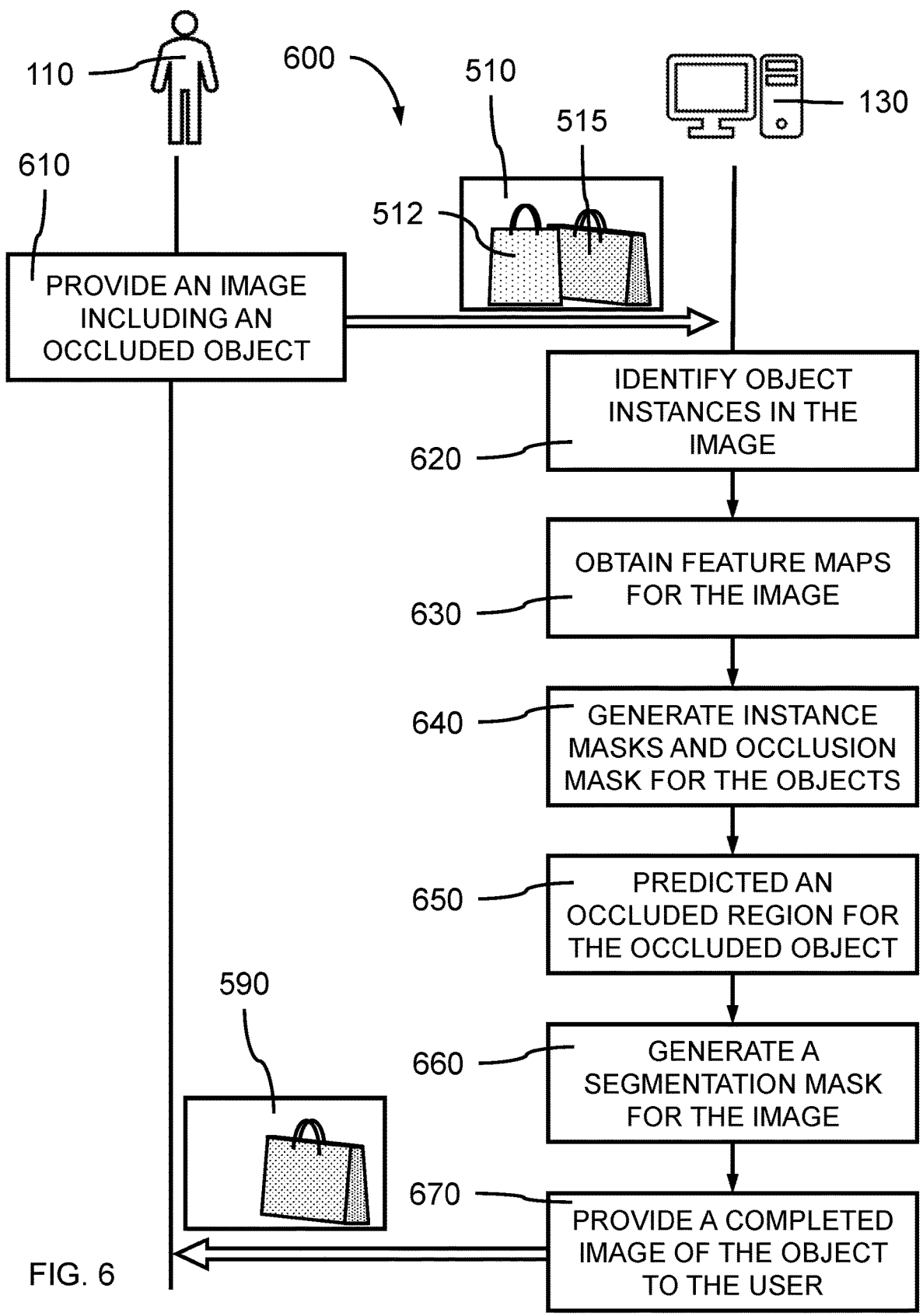
FIG. 6 is an illustrative depiction of a high level diagram of user inputs to an image processing system to perform amodal instance segmentation using a diffusion model, according to aspects of the present disclosure.

FIG. 6 is an illustrative depiction of a high level diagram of user inputs to an image processing system to perform amodal instance segmentation using a diffusion model, according to aspects of the present disclosure.

In various embodiments, an amodal instance segmentation process 600 can be performed to identify occluded regions of one or more objects in an image, generate image patch(es) for the unseen, occluded regions, and produce a complete amodal mask of the occluded object.

At operation 610, a user 110 can provide an initial image 510 to an image processing system 130, where the initial image may include at least one occluded object 515 and an occluding object 512. The image processing system 130 can be configured to identify the objects 512, 515 in the image 510, generate masks for the objects, generate an amodal segmentation mask for an occluded portion of an occluded object 515, and generate an image patch to fill in the unseen, occluded portion of the occluded object.

At operation 620, a segmentation head can identify a plurality of object instance 512, 515 in the image 510, where the plurality of object instances may be determined through instance segmentation of the image. In various embodiments, a mask network is used to provide an instance mask prediction and a rough occlusion prediction based on the features generated by an image encoder in the first step. The outputs of the first step are then provided to the diffusion model to perform amodal mask completion.

At operation 630, the image encoder can generate feature maps for the image 510, where the feature maps represent each object instance 512, 515. In some cases, an object segmentation head can identify the one or more object instances in an image that may be subject to occlusion. In some examples, the image encoder represents a backbone or another component of a mask network.

At operation 640, an instance mask can be generated for each of the object instances 512, 515, where the instance masks specify the visible portions of each of the objects 512, 515. The instance masks can be generated by a trained mask network, that can distinguish separate objects, where the instance masks can be generated based on the output of the instance segmentation. An occlusion mask can be generated for the overlapping visible region of the occluding object 512 and occluded object 515. The occlusion mask is not necessarily the exact overlapping visible region of the occluding object 512 and occluded object 515. The occlusion mask could be as small as the ground-truth invisible region of the occluded object 515, or as large as the union of object masks of both occluding object 512 and occluded object 515. The object masks can be generated for each of the different instances.

At operation 650, an occluded region can be inferred for the occluded object 515 based on the occlusion mask and instance masks, where the occluded region can be inferred by the mask network. In various embodiments, the "occluded region" can correspond to a region depicted by an occlusion mask minus a region of the instance mask of the occluded object, where both are output from operation 640. In some cases, the occluded region is not visible in the original input image (i.e., because it corresponds to a part of an object concealed or hidden by another object in the image).

At operation 660, an amodal segmentation mask can be generated by the mask network, where the amodal segmentation mask combines the inferred occluded region with the visible region of the occluded object 515. The amodal segmentation mask can be predicted and generated by a diffusion model of the mask network. The segmentation mask may indicate the visible region and the occluded region of the object. However, in some cases the previously occluded region may not appear occluded in the segmentation mask (i.e., because the segmentation mask may be a binary mask, and objects other than the target object may not be identifiable in the segmentation mask.

At operation 670, a diffusion model can generate a complete image 590 of the occluded object 515, and provide the amodal segmentation mask with or without the completed image back to the user 110. The diffusion model can generate a complete image 590 of the occluded object 515 based on the original image 510 and the amodal segmentation mask, where the trained diffusion model can fill in the unseen, occluded region of the occluded object 515.

Figure 7:
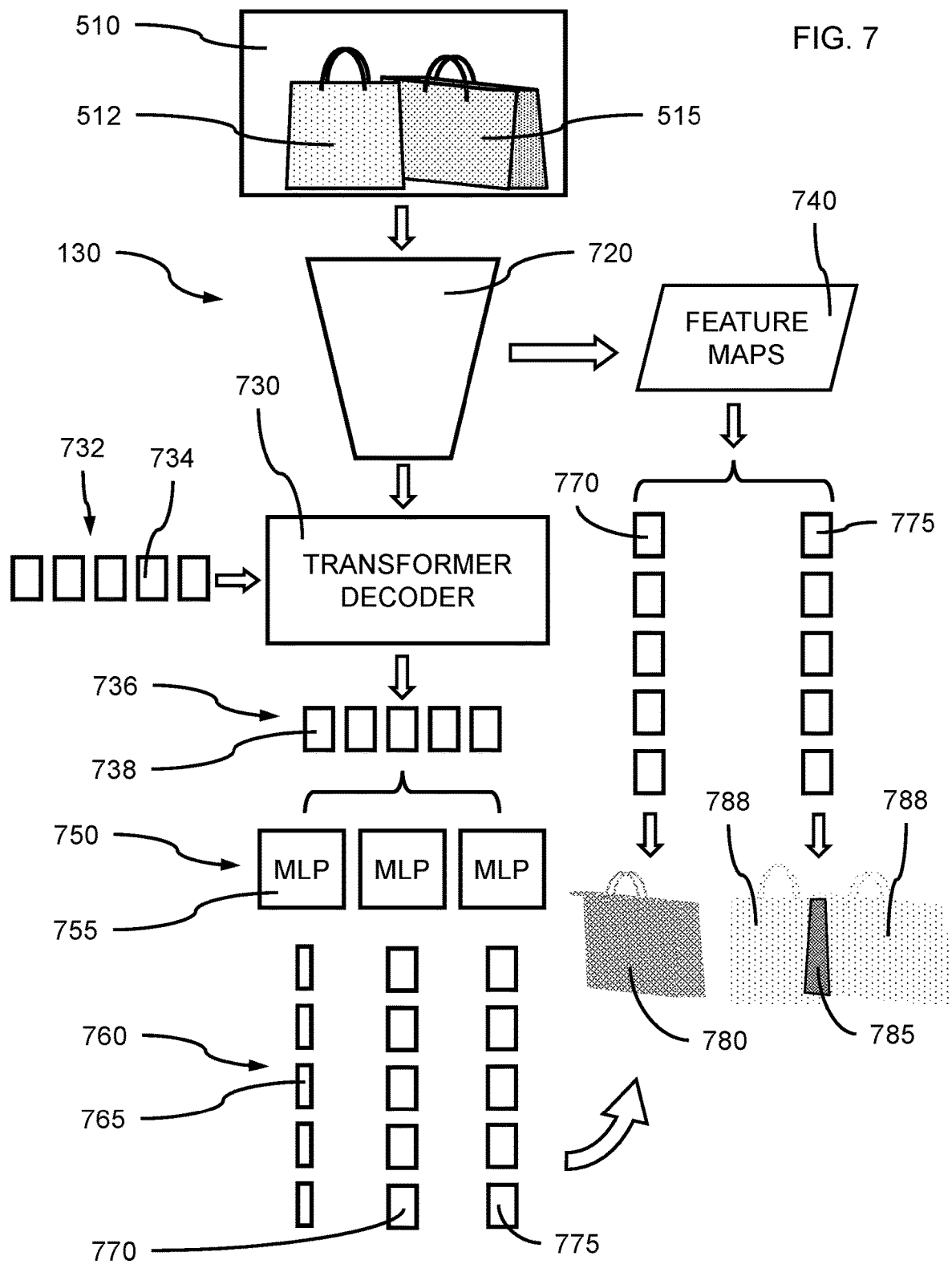
FIG. 7 is an illustrative depiction of a diagram of an image processing system to perform amodal instance segmentation using a mask network having a segmentation network and a diffusion model, according to aspects of the present disclosure.

FIG. 7 is an illustrative depiction of a diagram of an image processing system to perform amodal instance segmentation using a mask network having a segmentation network and a diffusion model, according to aspects of the present disclosure. For example, the image processing system depicted in FIG. 7 may be an example of a mask network including the mask component 240 of FIG. 2.

In various embodiments, the user 110 can submit the initial image 510 which may include at least one occluded object 515 and an occluding object 512, to an image processing system 130. The image processing system 130 can include a mask network having an image encoder 720 that can identify multiple objects of the same class as distinct individual objects or instances 512, 515 in the image 510. The image encoder 720 can generate features that include information indicating which object is the occluding object and which object is the occluded object that would be completed.

The image encoder 720 can include a plurality of convolutional neural network (CNN) layers that forms a backbone of the mask network of the image processing system 130. In various embodiments, the image can be divided into fragments, for example, patches of a predetermined size. The image encoder 720 can generate one or more feature maps 740, which may be semantic rich feature maps(s). Feature maps generated by a convolution operation can represent the spatial arrangement of the activations in a convolutional layer.

In various embodiments, the image 510 can include one or more pairs of occluded/occluding objects 512, 515, where the multiple objects may be dispersed throughout the image.

In various embodiments, the image encoder 720 can have an architecture, including, but not limited to, ResNET, ResNeXT, Mask2Former, Swin Transformers, etc. The image encoder 720 can be changed depending on the size, speed and accuracy intended for the image processing system 130.

In various embodiments, an input RGB image can be split into non-overlapping image patches by a patch splitting module. Each image patch is treated as a "token", where a feature is set as a concatenation of the raw pixel RGB values. For example, with a patch size of 4×4, the feature dimension of each patch would be 4×4×3=48 for the RGB image. A linear embedding layer can be applied to this raw-valued feature. In various embodiments, each window can contain M×M image patches.

In various embodiments, an image 510 can be tokenized into discrete visual tokens according to a learned vocabulary. A pre-training task of the image encoder 720 aims at predicting the visual tokens of the original image based on the encoding vectors of the corrupted image. The image can be represented as a sequence of discrete tokens obtained by an "image tokenizer", instead of raw pixels. The tokenizer q(z|x) maps image pixels x into discrete tokens z according to a visual codebook (i.e., vocabulary). For example, an RGB image can be compressed into an N×N grid of image tokens, each element of which can assume one of, e.g., 8192 possible values. The model learns to recover the visual tokens of the original image, instead of the raw pixels of masked patches. A diffusion model learns to reconstruct the input image x based on the visual tokens z.

In various embodiments, the image processing system 130 can include a transformer decoder 730 that can be configured to generate masks, tokens, labels, and confidence scores. Tokens can represent a patch of an image, where a token can be created for each small patch of the image. The image patch can be mapped to a feature vector referred to as the token. An output from the image encoder 720, including multi-level features, can be input to the transformer decoder 730, along with a set 732 of input tokens 734. The input tokens 734 can be fed into the transformer decoder 730 to be used for self-attention, and the transformer decoder 730 can generate a set 736 of output tokens 738, based on the input tokens 734 and multi-level features.

The output of the transformer decoder 730 can be fed to output heads including one or more neural network layers 750. The neural network layers 750 can include one or more multilayer perceptrons 755.

In various embodiments, the input token set 732 can have one input token 734 generated for each of the individual objects or instances 512, 515 in the image 510. In various embodiments, the output token set 736 can have one output token 738 generated for each of the individual objects or instances 512, 515 in the image 510.

In various embodiments, the neural network layers 750 can include a first head configured to generate an instance mask and a second head configured to generate an occlusion mask indicating a candidate occluded region. The neural network layers 750 can also include a third head configured to generate class agnostic values, for example, a set 760 of class-agnostic logits 765, indicating an object presence. In various embodiments, a visible mask head and an amodal mask head share the same architecture and can use four 3×3 convolutions and ReLU layers to generate meaningful features for mask prediction.

In various embodiments, a multilayer perceptron 755 can generate a set 760 of class-agnostic logits 765, where the class-agnostic logits 765 can indicate the objectness of the objects in the image 510. A multilayer perceptron 755 can generate a first kernel 770 for generating a visible mask. A multilayer perceptron 755 can generate a second kernel 775 for generating an occluded mask.

In various embodiments, the input tokens 734, output tokens 738, first kernel 770, and second kernel 775 can each have dimension of N×C, where C is the number of channels and N is a hyperparameter indicating the number of kernels to be generated. The number of kernels indicates the number of objects that can be identified in the image, and the number of masks that can be generated, which indicated the capacity of the mask network of the image processing system. In various embodiments, N can be a value in the range of 100 to 200, where N is the maximum number of instances that could be identified by the model.

In various embodiments, training can involve setting the identified occluded region 785 with a label, "1" to train the positive mask generation of the occluded region 785, and the remaining occlusion region 788 can be set to "0" for an occlusion mask to label it as "ignore", which means there will be no penalty regardless of whether the model predicts a −1 or a +1 for occlusion region 788. A background region of the image 510 outside of the combined regions of the positive mask region 785 and remaining occlusion region 788 can be set to "−1" to train the negative mask generation (e.g., for background). As a result, the mask model may predict a positive, "+1", mask larger than the region 785, but smaller than the union of occluded region 785 and occlusion region 788.

In various embodiments, the first kernel 770 and the second kernel 775 can be applied to the feature maps 740, where the first kernel 770 applied to the feature maps 740 can generate a positive mask for the visible region 780 of the occluded object 515, and the second kernel 775 can generate a positive mask for the invisible/occluded region of the occluded object 515. The first kernel 770 can generate the positive mask through convolution applied to the feature map(s) 740. The second kernel 775 can generate the positive mask through convolution applied to the feature map(s) 740. An ignore mask can be distinguished from ignored/neutral regions of overlapping occlusion regions 788 for both of the individual objects/instances 512, 515.

In various embodiments, objectness quantifies how likely it is for an image window to include an object of any class, as compared to an amorphous background (sometimes referred to as stuff). An objectness measure can distinguish windows containing an object from background. Objectness can be used to reduce the number of windows examined by an object detector. The class-agnostic logits 765 can be used to determine the objectness of features in an image, and the objects in the image can be identified based on the logits. The class-agnostic logits 765 can be predicted concurrently and in parallel with the first kernel 770, and second kernel 775 by the multilayer perceptrons (MLPs) 755. According to the objectness score, some kernels can be discarded because it is unnecessary to check their mask output.

In various embodiments, once objects and their positions have been identified, it can be determined which objects overlap with other objects. This may be accomplished using a plurality of kernels, where a first kernel can be used to predict a mask for a seen portion of overlapping objects and a second kernel can be used to predict a mask for the visible portion of the occluded object.

In various embodiments, the diffusion model receives two pieces of information, the visible region of the occluding and occluded object 515 and the possible invisible/occluded region of the occluded object. The information can be received as the output from kernel 1 770 for the visible region of the occluded object 515, and the output from kernel 2 775 for a possible occluded region, which can be larger than the ground truth region for the invisible/occluded portion of the occluded object 515, but smaller than the combined regions of occluded region 785 and the combined regions of occluded region 785 and occlusion region 788.

The diffusion model can determine the shape and size of the occluded object from instance masks and the occlusion mask based on the different regions. In various embodiments, the visible region 780 of the occluded object 515 can be subtracted from the possible occluded region 785 to obtain remaining region 788, which can be indicated by a "0". The regions not labelled as "1" or "0" are indicated as "-1". The visible region 780 of the occluded object 515 is labelled as "+1". The remaining region 788 is labelled "0". The background region is indicated as "-1".

In various embodiments, the mask network can generate a single channel map as a binary mask having labels 1 for positive regions and -1 for negative regions. A value of 0 can signify the whole area, as represented by an occlusion mask.

In various embodiments, the transformer decoder 730 can generate the set 736 of output tokens 738 for generating the logits 765, the first kernel 770, and the second kernel 775. The first kernel 770 and the second kernel 775 can be applied to the feature maps 740 generated by the image encoder 720 to generate a positive mask for the visible region 780 and a positive mask for the occlusion region 788, where the first kernel 770 and the second kernel 775 can be applied to the feature maps 740 through convolution.

In various embodiments, the kernel(s) 770, 775 can be used as 1×1 convolution layer applied to the feature map 740, to generate an output with dimensions of H×W×1. In various embodiments, a sigmoid activation function can be used to map the output to an output value, [0-1]. By applying a threshold to the output values, the binary mask(s) (+1, 0) can be obtained. The first kernel 770 can generate the positive mask, and the second kernel 775 can generate a positive mask that is larger than occluded region 785 but smaller than the combined occluded region 785 and remaining occlusion region 788.

Figure 8:
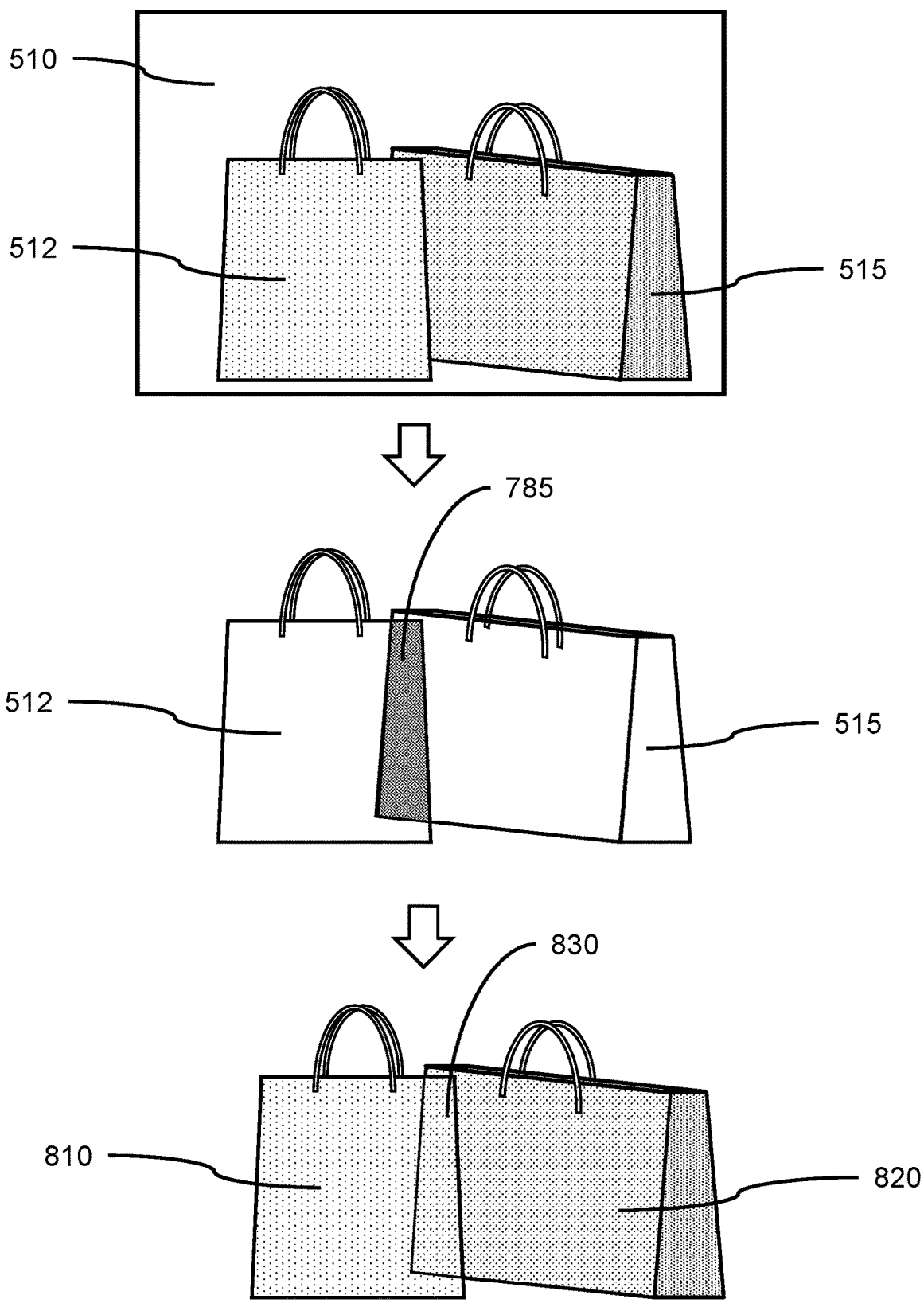
FIG. 8 is an illustrative depiction of a method of mask determination, according to aspects of the present disclosure.

FIG. 8 is an illustrative depiction of a method of mask determination, according to aspects of the present disclosure.

In various embodiments, an occluding object 512 and an occluded object 515 can be identified in an image 510 through object identification and instance segmentation. An occluded region 785 can be identified from the overlap of the occluding object 512 and an occluded object 515. The occluded region 785 can be identified using the amodal ground-truth applied to training images by human labelers.

In various embodiments, instance masks 810, 820 can be generated by a mask network. The instance mask 810 indicates the visible region of the occluding object 512, and the instance mask 820 indicates the visible region 780 of the occluded object 515. The instance masks can be used to generate an occlusion mask for the union of the objects 512, 515. To obtain training labels for the regions 785, 788, ground truth instance masks 810, 820 and amodal mask(s) 830, that are drawn by the human labelers, are first obtained for objects 512 and 515. For mask model inference, the instance mask 820 for object 515 is inferred and used for prediction of the amodal mask 830.

Figure 9:
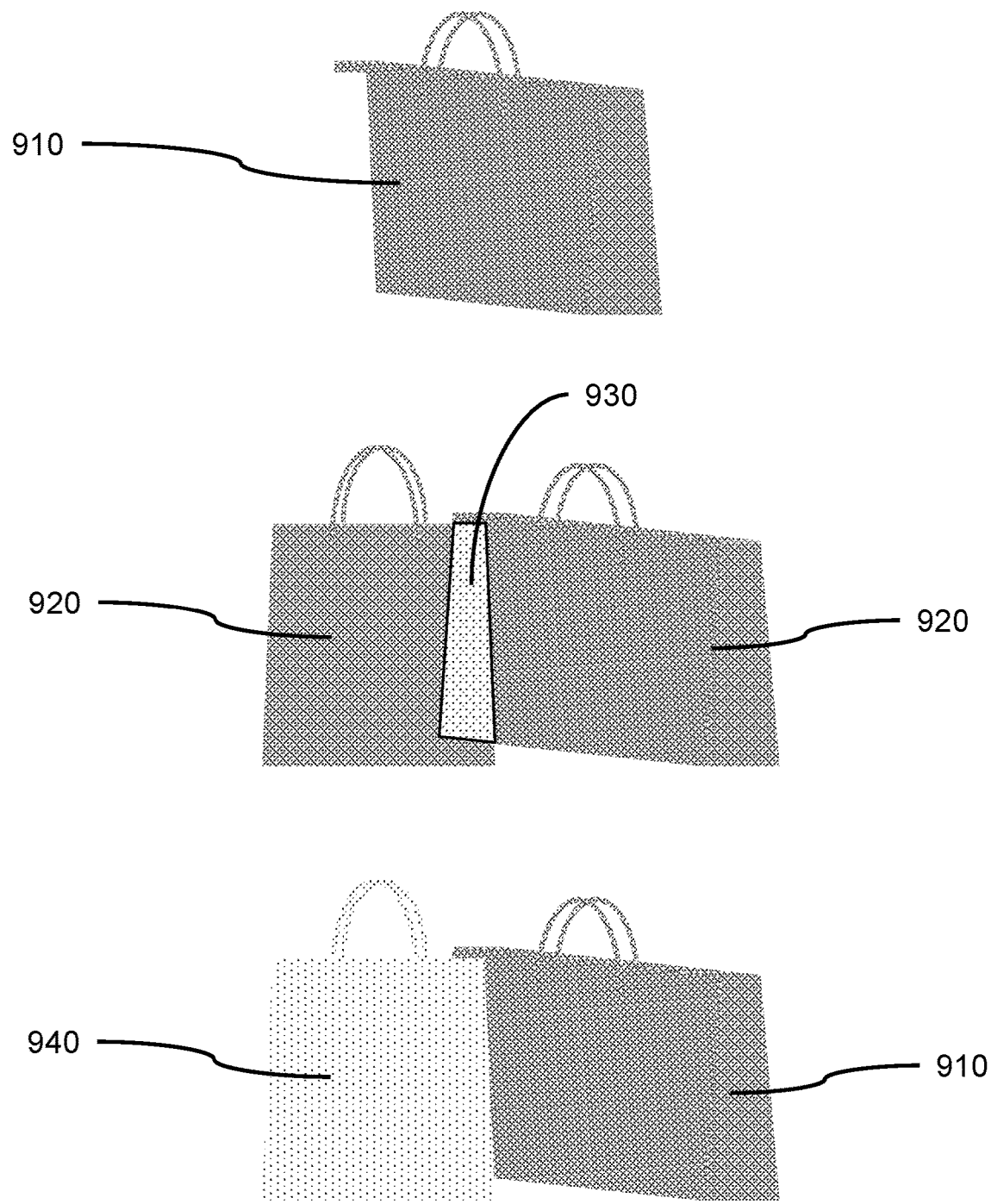
FIG. 9 is an illustrative depiction of a mask prediction operation, according to aspects of the present disclosure.

FIG. 9 is an illustrative depiction of a mask prediction operation, according to aspects of the present disclosure. In various embodiments, a positive visible mask 910 can be generated for the visible portion of an occluded object 515 by the mask network, where the positive visible mask 910 can be based on the visible portion 780 and instance mask 820 of the occluded object 515. The positive visible mask 910 can be based on a category independent prediction.

In various embodiments, the occlusion mask 920 can be generated for the visible portion of both the occluded object 515 and the occluding object 512 by the mask network, where the occlusion mask 920 can be the total visible area of both objects. The occlusion mask 920 can be made larger to assist in the determination of the shape of the background occluded object 515. An occluded mask 930 larger than the invisible region 785 of object 515 but smaller than occlusion mask 920 can be generated. The prediction for the occluded mask 930 should be the occluded/invisible region 785 of object 515, but the mask model can be trained to predict a rough mask, which is larger than the "true" occluded/invisible region 785 of object 515.

The mask network can generate the positive visible mask 910 for the visible region of occluded object 515 and an occlusion mask 920 for the combined visible region of the occluding object 512 and the occluded object 515.

The positive visible mask 910 can be generated for the occluded object 515 based on kernel 1 770. The occluding mask 940 based on instance masks 810 for the occluding object 512 can be labelled as "ignored." The occluded mask 930 for the occluded region of the occluded object 515 can be predicted, where the predicted occluded mask 930 can be larger than the actual invisible/occluded region 785 of object 515 but smaller than the overall occlusion mask.

Figure 10:
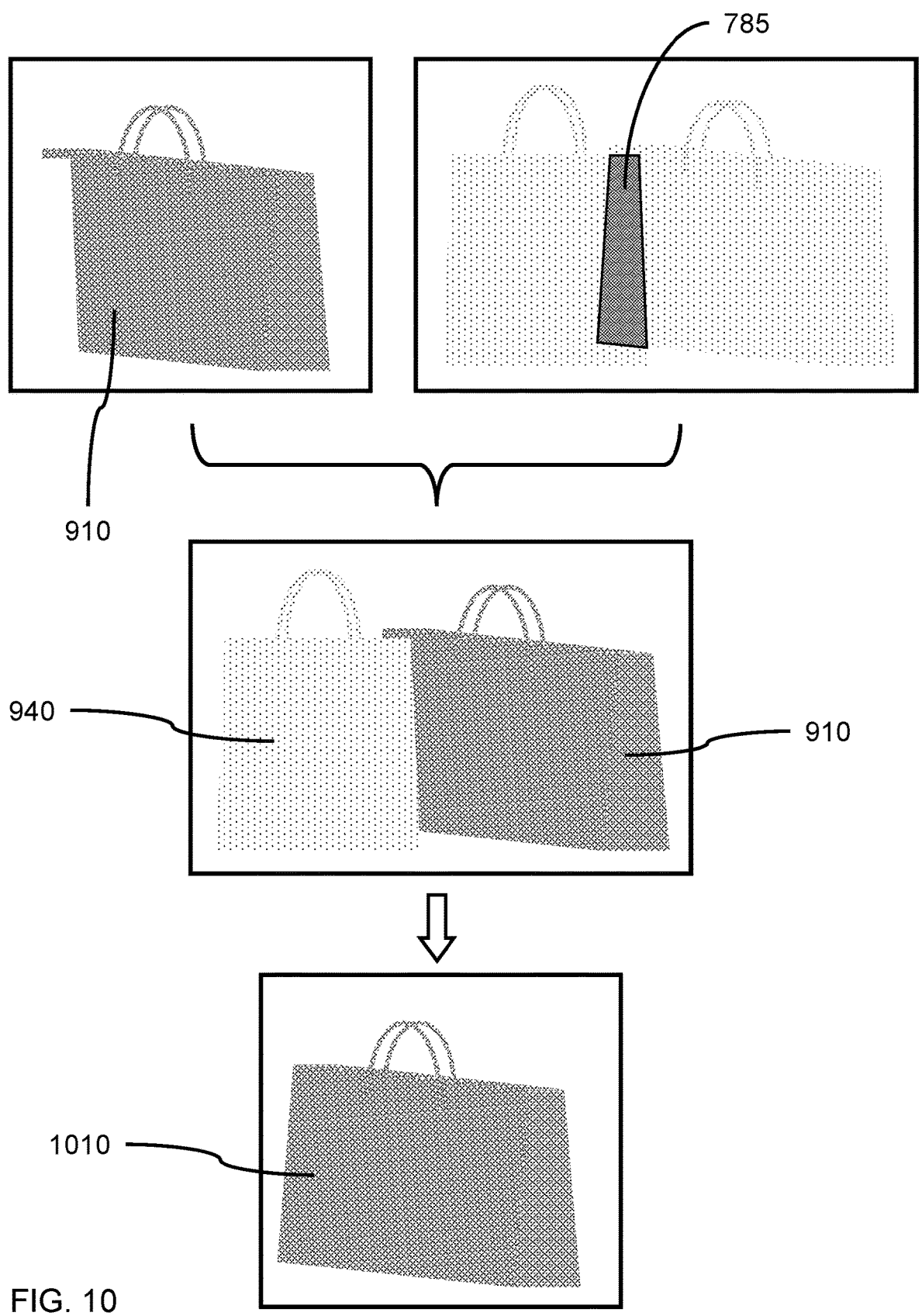
FIG. 10 is an illustrative depiction of a mask completion operation, according to aspects of the present disclosure.

FIG. 10 is an illustrative depiction of a mask completion operation, according to aspects of the present disclosure.

In various embodiments, a visible mask 910 indicating the visible region of the occluded object 515 can be generated for the input image 510 using the mask network based on the instance mask 820. The instance mask 820 can be based on the object detection and feature masks previously generated by the mask network. An occluded region 785 can be identified in the image 510. In various embodiments, an amodal segmentation mask is the union of the visible mask referred to as a modal mask, compared to the amodal mask, and the invisible occlusion mask of the object.

In various embodiments, a diffusion model (e.g., U-Net) can generate the amodal segmentation mask 1010 based on the occluded image and an occlusion mask 920. The masked image including the occluded region 785 can be used as an input to a diffusion model. In various embodiments, an amodal segmentation mask 1010 is the union of the visible mask 910, also referred to as a modal mask, and the occluded mask 930 for the invisible/occluded region 785 of the occluded object 515. In various embodiments, an L1/L2 loss can be used as an objective for training the mask model to predict the amodal segmentation mask 1010.

In various embodiments, the amodal segmentation mask 1010 can be provided to a diffusion model to generate a complete image of the original occluded image, where the diffusion model generates the unseen, occluded portion of the occluded object. The diffusion model can receive red-green-blue (RGB) input values of the original image and a binary amodal segmentation mask 1010 that represents the complete object as input, and generate an image patch to fill in the unseen, occluded region of the occluded object in the original image. The diffusion model can also receive the class of the occluded object as a text prompt or description that can guide the generation of the missing part of the occluded object.

Figure 11:
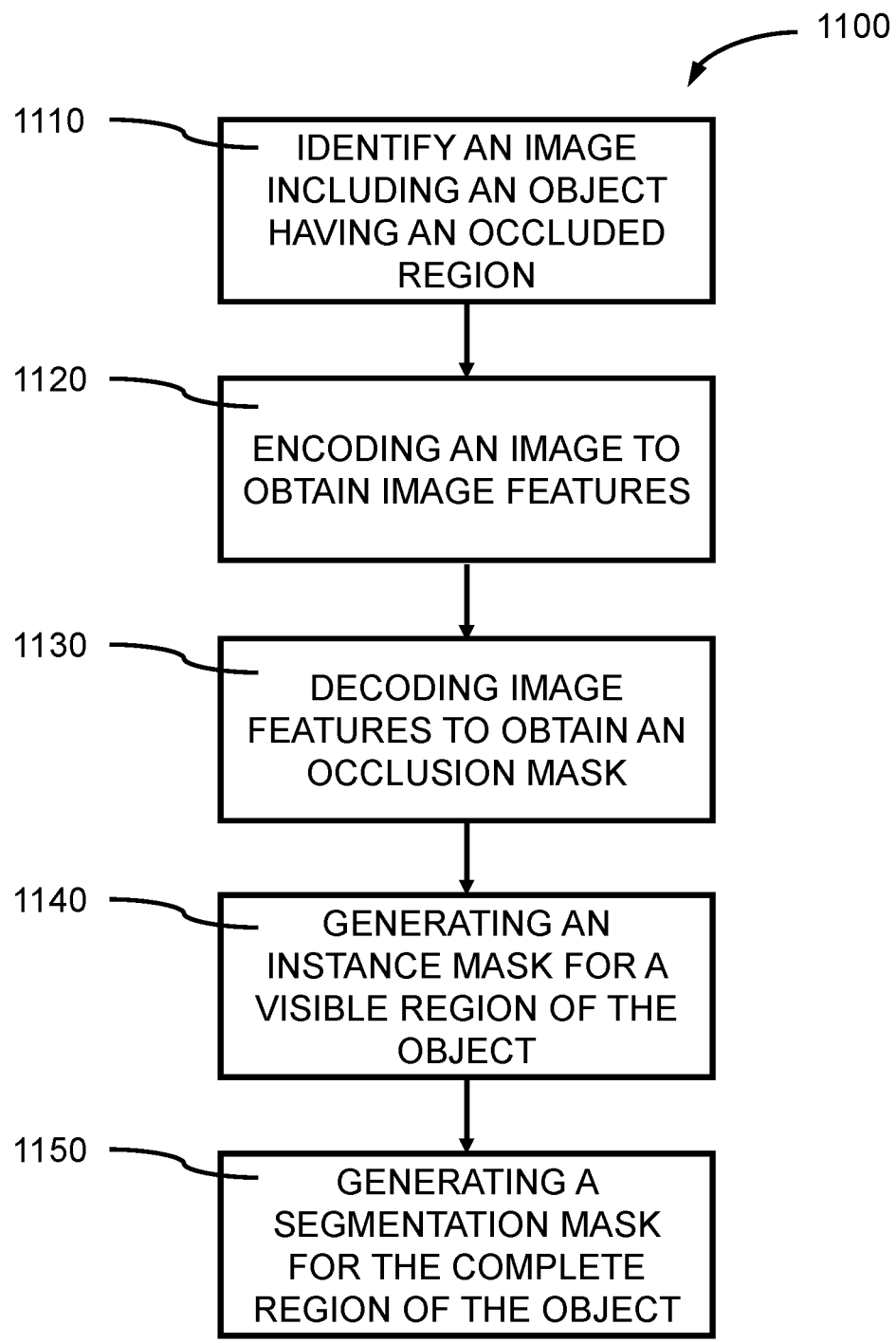
FIG. 11 shows a flow diagram of a method for generating an amodal segmentation mask, according to aspects of the present disclosure.

FIG. 11 shows a flow diagram of a method for generating an amodal segmentation mask, according to aspects of the present disclosure. The amodal segmentation mask generation method 1100 can generate an amodal segmentation mask for an image including an occluded object.

At operation 1110, an image including an object having an occluded region is identified. The image may be provided by a user and/or previously generated by an image generation model, for example, a variational autoencoder (VAE), generative adversarial network (GAN), or diffusion model (DM).

At operation 1120, the image can be encoded to obtain image features and feature maps. The encoding can generate a feature map through convolution (e.g., by a CNN) applied to the image. Encoding can identify object instances in the image.

At operation 1130, the image features can be decoded to obtain an occlusion mask for the occluding and occluded objects.

At operation 1140, an instance mask can be generated for a visible region of the occluded object. In various embodiments, operation 1130 and operation 1140 can be done in parallel.

At operation 1150, an amodal segmentation mask can be generated for a complete region, including the visible and occluded portions, of the occluded object, where the amodal segmentation mask is based on the occlusion mask.

Training

In various embodiments, a first machine learning model (e.g., the mask network) and a second machine learning model (e.g., the diffusion model) can be trained together to identify objects in an image, generate masks for the objects, and generate an amodal segmentation mask based on the identified objects and masks.

Figure 12:
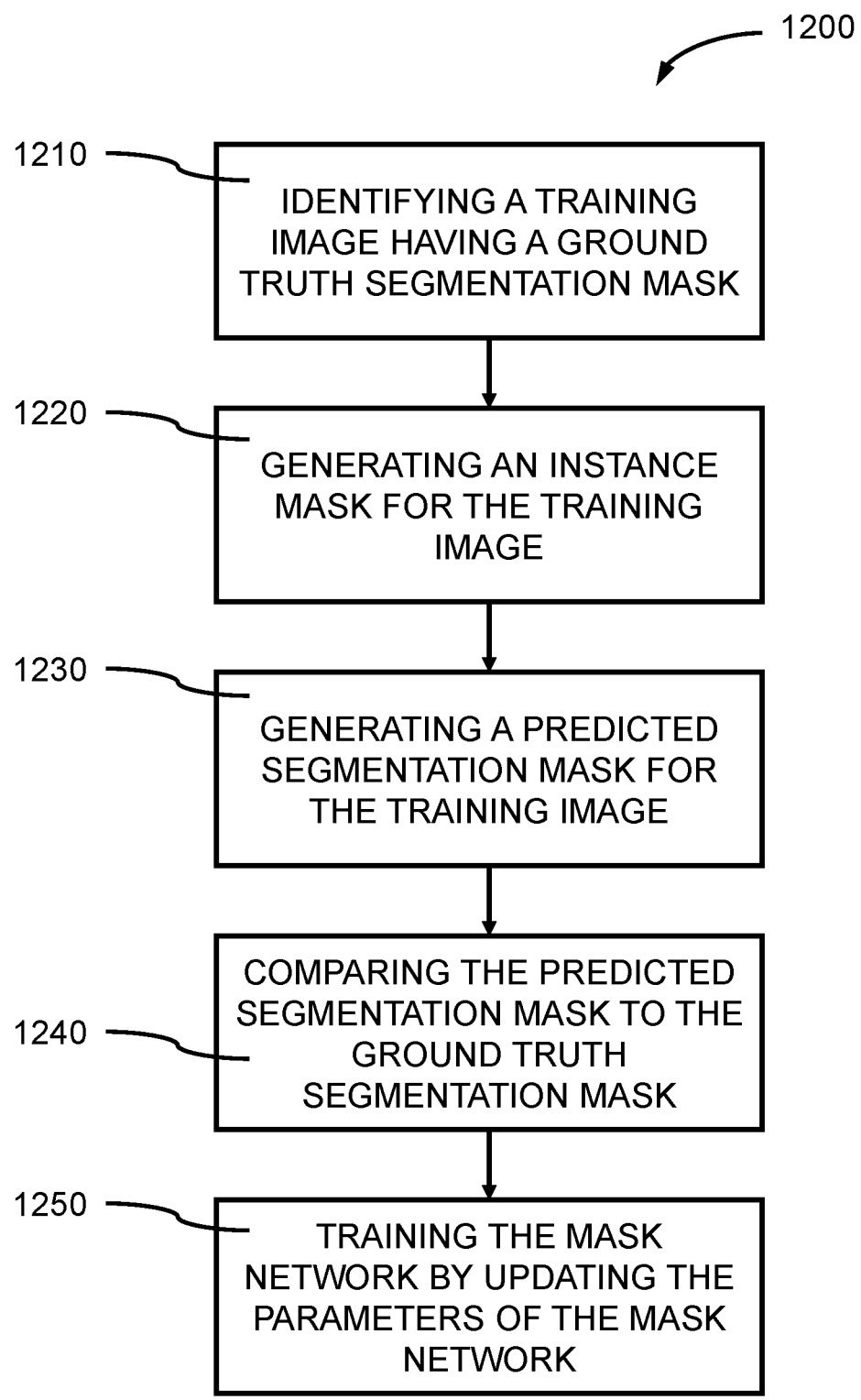
FIG. 12 shows a flow diagram for a method of training a mask network, according to aspects of the present disclosure.

FIG. 12 shows a flow diagram for a method of training a mask network, according to aspects of the present disclosure. One or more machine learning models including a mask network and a diffusion model can be trained through supervised learning. The mask training method 1200 can involve adjusting parameters of transformers, encoders, decoders, deep neural networks, and diffusion models based on error scores between ground truth masks and predicted segmentation masks.

At operation 1210, a training image can be identified, where the training image can include an occluded object having a visible region and an occluded region. An occluding object is in front of the occluded region of the occluded object. The training image can include a ground truth segmentation mask for the occluded object, where a ground truth amodal segmentation mask indicates a region that includes the visible region and the occluded region of the occluded object.

At operation 1220, a mask network can generate an instance mask for the training image, where the instance mask indicates the visible region of the occluded object. The instance mask can represent a single occurrence of the occluded object amongst a plurality of objects in the image including the occluding object. The instance mask can represent the extent of the occluded object visible in the image, where the occluded portion is not visible in the image.

In various embodiments, to train the mask network, a first head of the network can generate an instance mask for each object and a second head can generate an occlusion mask for the union of objects. The generated instance mask for each object can be compared to the ground truth instance masks, and an error calculated. The generated occlusion mask can be compared to the ground truth occlusion mask, and an error calculated. The errors for the generated instance masks and generated occlusion mask can be back-propagated through the mask network to update the parameters of the mask network.

At operation 1230, a predicted segmentation mask can be generated for the training image by the mask network. The predicted segmentation mask can represent the mask network's expectation of the size and shape of the non-visible region of the occluded object based on the visible region of the object, and the distribution learned from the training data. In various embodiments, the ground truth for the first kernel is different from the ground truth for the second kernel.

At operation 1240, the predicted amodal segmentation mask can be compared to the ground truth segmentation mask, and an error score calculated. In various embodiments, the error score can be calculated based on an L1/L2 loss.

In various embodiments, the training objective for the mask2former network is binary cross entropy and dice loss. The training objective for the diffusion model can be a L1/L2 loss. To evaluate the model performance, average precision. (AP) can also be used.

At operation 1250, the parameters of the mask network can be updated, for example, through back propagation based on the comparison, to more closely match the expected position and area of the masks and amodal segmentation mask. Updating the parameters of the diffusion model of the mask network based on the comparison can train the diffusion model to generate more accurate segmentation masks.

In various embodiments, 40,000 images with multiple annotated instances can be used as the training set. A cross-entropy loss can be used to train object identification by the image encoder 720. Cross-entropy loss can be used to train the mask network for mask prediction.

Figure 13:
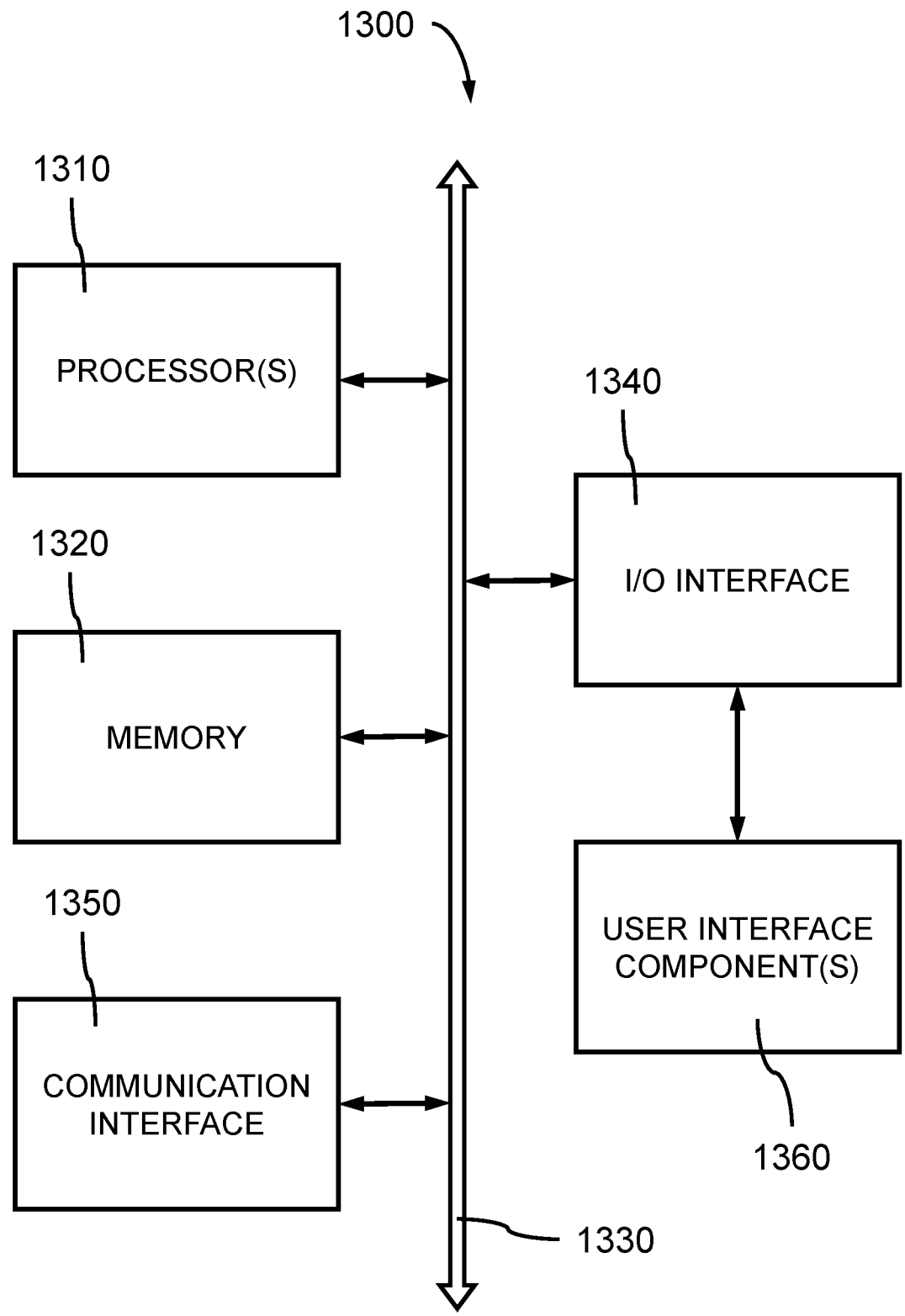
FIG. 13 shows an example of a computer system according to aspects of the present disclosure.

FIG. 13 shows an example of a computer system according to aspects of the present disclosure. In one aspect, the computing device includes processor(s) 1310, memory subsystem 1320, communication interface 1350, I/O interface 1340, user interface component(s) 1360, and channel 1320. The computer system 1300 can be configured to perform the operations described above and illustrated in FIG. 1-12.

In some embodiments, computing device 1300 is an example of, or includes aspects of, image generation apparatus 200 of FIG. 2. In some embodiments, computing device 1300 includes one or more processors 1310 that can execute instructions stored in memory subsystem 1320 for identifying an original image including original content and a prompt requesting additional content to be added to a region of the original image; generating an embedding vector representing the description; and generating an output image including the original content from the original image and the additional content in the region using a diffusion model 1360 that takes the embedding vector as input.

According to some aspects, computing device 1300 includes one or more processors 1310. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1310 is configured to operate a memory array using a memory controller. In other cases, a memory controller is integrated into a processor. In some cases, a processor is configured to execute computer-readable instructions stored in a memory to perform various functions. In some embodiments, a processor 1310 includes special purpose components for modem processing, baseband processing, digital signal processing, or transmission processing.

According to some aspects, memory subsystem 1320 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1350 operates at a boundary between communicating entities (such as computing device 1300, one or more user devices, a cloud, and one or more databases) and channel (e.g., bus) 1330 and can record and process communications. In some cases, communication interface 1350 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1340 is controlled by an I/O controller to manage input and output signals for computing device 1340. In some cases, I/O interface 1340 manages peripherals not integrated into computing device 1300. In some cases, I/O interface 1340 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1330 or via hardware components controlled by the I/O controller.

According to some aspects, user interface component(s) 1360 enable a user to interact with computing device 1300. In some cases, user interface component(s) 1360 include an audio device, such as an external speaker system, an external display device such as a display screen, an input device (e.g., a remote control device interfaced with a user interface directly or through the I/O controller), or a combination thereof. In some cases, user interface component(s) 1360 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

identifying an input image comprising an object that includes a visible region and an occluded region, wherein the occluded region is concealed in the input image;

generating an instance mask for the input image using a first machine learning model, wherein the instance mask indicates the visible region of the object; and generating a segmentation mask for the input image by identifying a noise map with random noise and denoising the noise map based on the instance mask using a second machine learning model comprising a diffusion model, wherein the segmentation mask indicates a completed region that includes the visible region and the occluded region.

2. The method of claim 1, further comprising:

encoding the input image to obtain image features; and decoding the image features to obtain the instance mask.

3. The method of claim 2, further comprising:

decoding the image features to obtain an occlusion mask, wherein the segmentation mask is based on the occlusion mask.

4. The method of claim 2, further comprising:

decoding the image features to obtain a plurality of class agnostic values indicating object presence.

5. The method of claim 2, further comprising:

generating an occluded image based on the input image, wherein the segmentation mask is based on the occluded image.

6. The method of claim 1, further comprising:

identifying the noise map including random noise, wherein the segmentation mask is generated based on the noise map.

7. The method of claim 1, wherein the segmentation mask comprises a plurality of overlapping regions corresponding to a plurality of objects in the image, respectively.

8. A method comprising:

identifying a training image and a ground truth segmentation mask for the training image, wherein the training image comprising an object that includes a visible region and an occluded region and the ground truth segmentation mask indicates a completed region of the object that includes the visible region and the occluded region;

generating an instance mask for the training image using a first machine learning model comprising a mask network, wherein the instance mask indicates the visible region of the object;

generating a predicted segmentation mask for the training image by identifying a noise map with random noise and denoising the noise map based on the instance mask using a second machine learning model comprising a diffusion model, wherein the predicted segmentation mask indicates the completed region;

comparing the predicted segmentation mask to the ground truth segmentation mask; and training the mask network by updating the parameters of the mask network based on the comparison.

9. The method of claim 8, further comprising:

training the diffusion model by updating parameters of the diffusion model based on the comparison.

10. The method of claim 8, wherein:

the diffusion model is pretrained before training the mask network.

11. The method of claim 8, further comprising:

encoding the training image to obtain image features; and decoding the image features to obtain the instance mask.

12. The method of claim 11, further comprising:

decoding the image features to obtain an occlusion mask, wherein the predicted segmentation mask is based on the occlusion mask.

13. The method of claim 11, further comprising:

identifying a positive supervision region corresponding to the occluded region; and identifying a negative supervision region corresponding to a region that does not correspond to the object, wherein the mask network is trained based on the positive supervision region and the negative supervision region.

14. The method of claim 13, further comprising:

identifying a neutral supervision region corresponding to a candidate occlusion region, wherein the mask network is not trained based on the neutral supervision region.

15. An apparatus comprising:

a processor;

a memory containing instructions executable by the processor;

a first machine learning model configured to generate an instance mask for an input image comprising an object that includes a visible region and an occluded region, wherein the instance mask indicates the visible region of the object; and a second machine learning model comprising a diffusion model configured to generate a segmentation mask for the input image by identifying a noise map with random noise and denoising the noise map based on the instance mask, wherein the segmentation mask indicates a complete region of the object that includes the visible region and the occluded region.

16. The apparatus of claim 15, wherein:

the first machine learning model includes an image encoder configured to encode the input image to obtain image features.

17. The apparatus of claim 16, wherein:

the first machine learning model comprises a decoder including a first head configured to generate the instance mask and a second head configured to generate an occlusion mask indicating a candidate occlusion region.

18. The apparatus of claim 17, wherein:

the decoder comprises a third head configured to generate class agnostic values indicating object presence.

19. The apparatus of claim 17, wherein:

the encoder comprises a convolutional neural network, and the decoder comprises a transformer network.

20. The apparatus of claim 15, wherein:

the diffusion model comprises a U-Net architecture.

* * * * *